United States Patent [19]

Brown et al.

[11] Patent Number: 4,517,673

[45] Date of Patent: May 14, 1985

[54] COMPUTER-BASED INTERLOCKING SYSTEM

[75] Inventors: Christopher R. Brown, Bromham, Near Chippenham; John D. Corrie; William G. J. Wilson, both of Chippenham, all of England

[73] Assignee: Westinghouse Brake & Signal Co., Wiltshire, England

[21] Appl. No.: 425,918

[22] Filed: Sep. 28, 1982

[30] Foreign Application Priority Data

Oct. 10, 1981 [GB] United Kingdom ............... 8130644

[51] Int. Cl.³ .................... G06F 11/00; G06F 11/08
[52] U.S. Cl. ........................................ 371/36; 371/68
[58] Field of Search ........................... 371/36, 68, 69

[56] References Cited

U.S. PATENT DOCUMENTS

| | | | |
|---|---|---|---|
| 3,501,743 | 3/1970 | Dryden | 371/36 |
| 3,538,498 | 11/1970 | Games et al. | 371/36 |
| 3,593,307 | 7/1971 | Gouge et al. | 371/68 X |
| 3,863,215 | 1/1975 | McGrogan, Jr. | 371/36 |
| 4,270,715 | 6/1981 | Norton et al. | 371/36 |

FOREIGN PATENT DOCUMENTS 1419673 12/1975 United Kingdom ............... 371/36

*Primary Examiner*—Jerry Smith
*Assistant Examiner*—Mark Ungerman
*Attorney, Agent, or Firm*—Larson and Taylor

[57] ABSTRACT

An interlocking system comprising a plurality, e.g., three, of parallel sub-systems operating asynchronously to produce identical replicated outputs which are mutually compared to determine the correct output and disqualifying a minority output thereby ensuring high system integrity. Each sub-system includes a similar arrangement for computing the difference between all possible pairs of sub-systems. Comparison of these results with a reference table of all possible difference results and then comparison of the difference equations yields a common factor which is the sub-system producing the error. Action can then be taken to disqualify its output, e.g., by switching-off its power supply. A final output is taken, preferably from one sub-system, with a second as standby. To accomodate asynchronous running, a final output is only acted upon if it is repeated in a succeeding output cycle thus permitting opportunity to disqualify the preferred output if it is judged in error by the other sub-systems and to replace it by the standby.

6 Claims, 3 Drawing Figures

FIG. 3

|  (A)(B)(c) | A | | | |
|---|---|---|---|---|
| M L R | ΔM-L | ΔL-R | ΔR-M | |
| 1 0 0 | 0 | 0 | 0 | |
| 1 0 0 | 0 1 | 0 | 0 | |
| 1 0 0 | ① | ① | 0 | → COMMON = M(A) |

| (B)(C)(A) | B | | | |
|---|---|---|---|---|
| M L R | ΔM-L | ΔL-R | ΔR-M | |
| 0 0 0 | 0 | 0 | 0 | |
| 0 0 1 | 0 | 0 1 | 0 | |
| 0 0 1 | 0 | ① | ① | → COMMON = R(A) |

| (C)(A)(B) | C | | | |
|---|---|---|---|---|
| M L R | ΔM-L | ΔL-R | ΔR-M | |
| 0 0 0 | 0 | 0 | 0 | |
| 0 1 0 | 0 | 0 1 | 0 | |
| 0 1 0 | ① | ① | 0 | → COMMON = L(A) |

(a) SUB-SYSTEM A IN ERROR

| A | | | |
|---|---|---|---|
| 0 X 0 | N | N | 0 |
| 1 X 0 | N | N | 0 |
| 1 X 1 | N | N | 1 |
| 1 X 0 | N | N | 0 |

| B | | | |
|---|---|---|---|
| 0 0 X | 0 | N | N |
| 1 0 X | 0 | N | N |
| 1 1 X | 1 | N | N |
| 1 0 X | 0 | N | N |

(b) SUB-SYSTEM B IN ERROR AND DISQUALIFIED

| A | | | |
|---|---|---|---|
| 1 X 0 | N | N | 0 |
| 1 X 0 | N | N | 1 |
| 1 X 0 | N | ① | ① | → DON'T KNOW
| 1 X 0 | N | N | 0 |

| B | | | |
|---|---|---|---|
| | | | |

| C | | | |
|---|---|---|---|
| 0 0 X | 0 | N | N |
| 0 1 X | 0 | N | N |
| 0 1 X | ① | N | N | → DON'T KNOW
| 0 1 X | 0 | N | N |

(c) AS IN (b) AND SUBSEQUENT ERROR IN C

COMPUTER-BASED INTERLOCKING SYSTEM

The invention relates to computer-based interlocking systems consisting of a plurality of parallel redundant sub-systems, particularly for generating railway control signals.

The traditional way of providing safety in a railway signal interlocking system is to employ only fail-safe components, e.g. relays. As such components have become increasingly more expensive, computers have promised cheaper solutions providing ways can be found to provide the same or greater levels of safety.

A fail-safe system must be able to tolerate any number of faults, occurring simultaneously or dispersed in time, without permitting an unsafe action to be executed erroneously. A problem inherent in computer systems is that this level of integrity cannot be achieved using single computers in their normal mode. One way improvements have been made by using multiple computer sub-systems which perform a similar function simultaneously using the same input data and comparing their outputs.

The present invention seeks to improve this type of arrangement. The basis of the invention is the analysis of all possible system faults and the realisation of where to place means for fault location and how to detect such faults in order to be able to eliminate effects which would otherwise degrade the level of safety of the system.

According to the present invention there is provided a control signal interlocking system comprising three parallel redundant sub-systems, each of which is connected to receive the same input data and arranged to perform a signal interlocking function in continuously repeated cyclic operation, means for consolidating the control outputs of the parallel sub-systems to provide a fail-safe control system output, wherein the outputs of a first and a second of the sub-systems are connected to output-selecting means operative to preferentially select the first sub-system output to provide the control system output or, alternatively, the second sub-system output in response to the output of means operative to check agreement between the sub-systems.

In order to eliminate one class of fault, the sub-systems operate asynchronously and the output-selecting means is arranged to provide a sub-system output to the control system output only after said output has been repeated in two successive cycles of operation.

To provide the required level of system integrity, it is preferred that the means operative to check agreement between the sub-systems comprises, in each sub-system, means for receiving outputs of all the sub-systems, determining difference results between the sub-system outputs, comparing those results with a reference table of possible difference results stored in a memory so as to determine, if differences exist, which sub-system is in error and means responsive to said comparison to produce in each sub-system and in respect of each sub-system a signal indicating an error.

The invention and how it may be carried into practice will now be described, by way of example only, with reference to the accompanying drawings, in which:

FIG. 3 shows as (a) an output difference results table in which sub-system A fails, shows at (b) difference results tables for A and C when B fails, and shows at (c) the situation if the remaining sub-systems A and C disagree.

Figure 1:
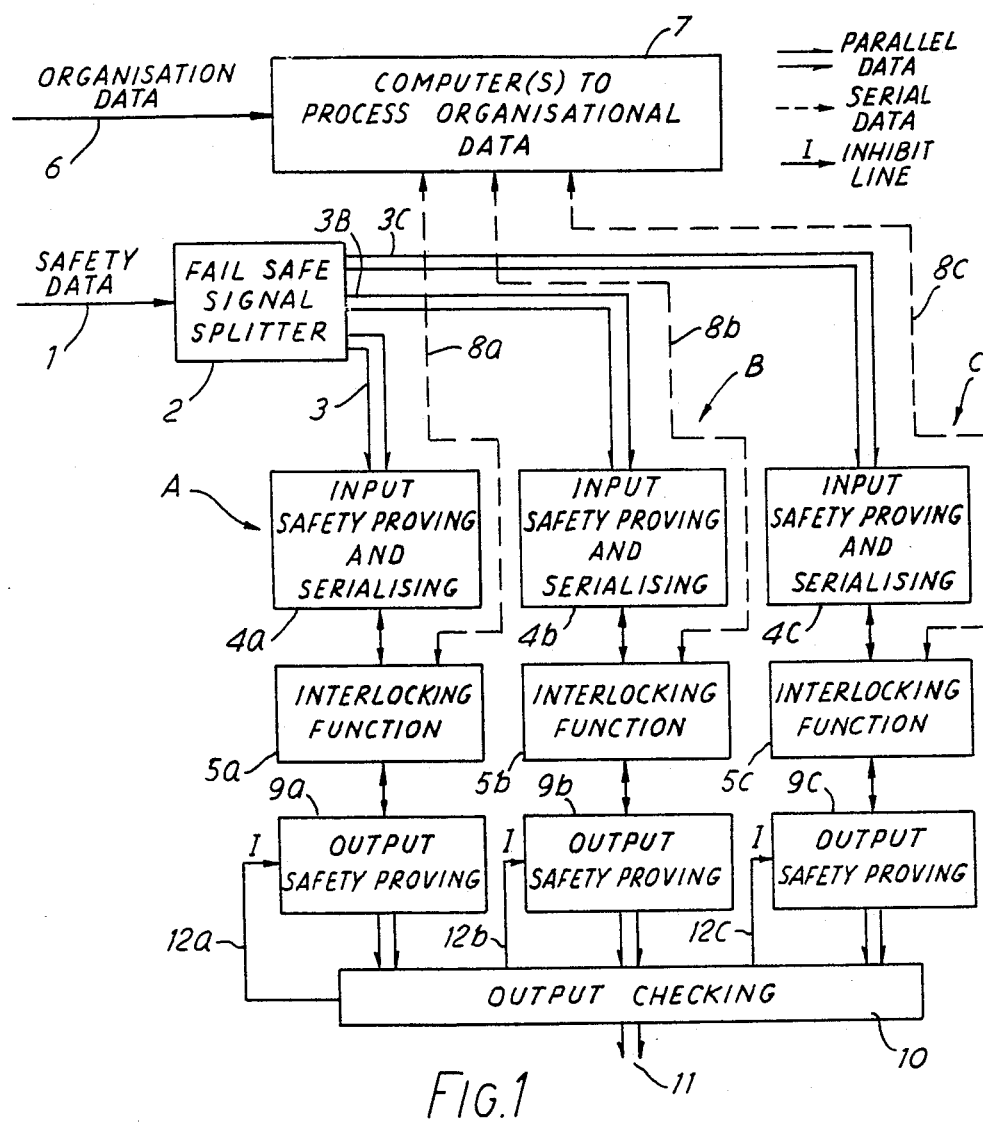
FIG. 1 shows in block diagram form a computer-based interlocking system having three parallel computer sub-systems.

Referring now to the drawings;

FIG. 1 shows a computer-based railway interlocking system comprising three parallel computer sub-systems, indicated generally by the references A, B and C. In all essential respects the three computer sub-systems are similar in construction and are identically programmed but their operation is not deliberately synchronised so that their normal operation is asynchronous. Vital input data, that is data directly concerned with the settings of traffic control devices, for the interlocking system is received in parallel format on a set of data lines 1 by a fail-safe signal splitter circuit 2 which triplicates the information onto three parallel data highways 3a, 3b and 3c, for distribution to the three sub-systems A, B and C, respectively. The vital input data is first received by input safety proving and serialising computers 4a, 4b and 4c, which carry out several functions; first to check the input circuits for faults and, second, to cyclically scan all input data lines reading each in turn. This reading may be initiated by an interrupt procedure, that is, when an input changes, the scan cycle skips over the intervening inputs directly to the newly changed input. The vital input data does not change frequently relative to the period of a scanning cycle which is of the order of approximately one second. In fact, most vital inputs will remain static for relatively extremely long periods of time, so that asynchronous operation presents no difficulties since, even when an input changes, the scan sample of data will not disagree for more than a period of one scan cycle. The serial outputs from circuits 4a, 4b and 4c are connected respectively to computers 5a, 5b and 5c, which are programmed to carry out safety interlocking procedures.

Non-vital input data is received on a data highway, indicated by reference 6, and which comprises, for example, route-setting data generated by setting of switches on a signalman's control desk or outputs of an automatic route-setting device of known type (not shown). This non-vital data, also referred to as organisational data, is also scanned, processed and presented on either single line (not shown) or triplicated lines 8a, 8b and 8c, directly to inputs to the interlocking function computers 5a, 5b and 5c.

The interlocking function computers 5a, 5b and 5c are under the control of self-diagnosing software programs designed to implement interlocking functions, which are already well-known in the prior art. Studies of the associated hardware reveal all possible failure modes and reference is made to the software specification to ensure that adequate test routines are frequently run. Where quasi-static variable data is stored in random access memory, it is stored in a plurality of locations which test routines regularly check for correspondence, thus implementing subordinate levels of redundancy within one sub-system, and permitting asynchronous operation of those sub-systems. Similarly, test routines check the coding of all serial messages and frequently check parity on stored transmission data.

The output of computers 5a, 5b and 5c is presented in serial data format to output safety proving processors 9a, 9b and 9c, respectively, in each sub-system, which are programmed to prove that the output circuits and connecting lines from the interlocking function computers are not faulty. The outputs from the computers 9a, 9b and 9c are supplied to a common circuit means 10 for consolidating the control outputs from the parallel sub-systems and distributes vital control signals on output data highway 11.

Figure 2:
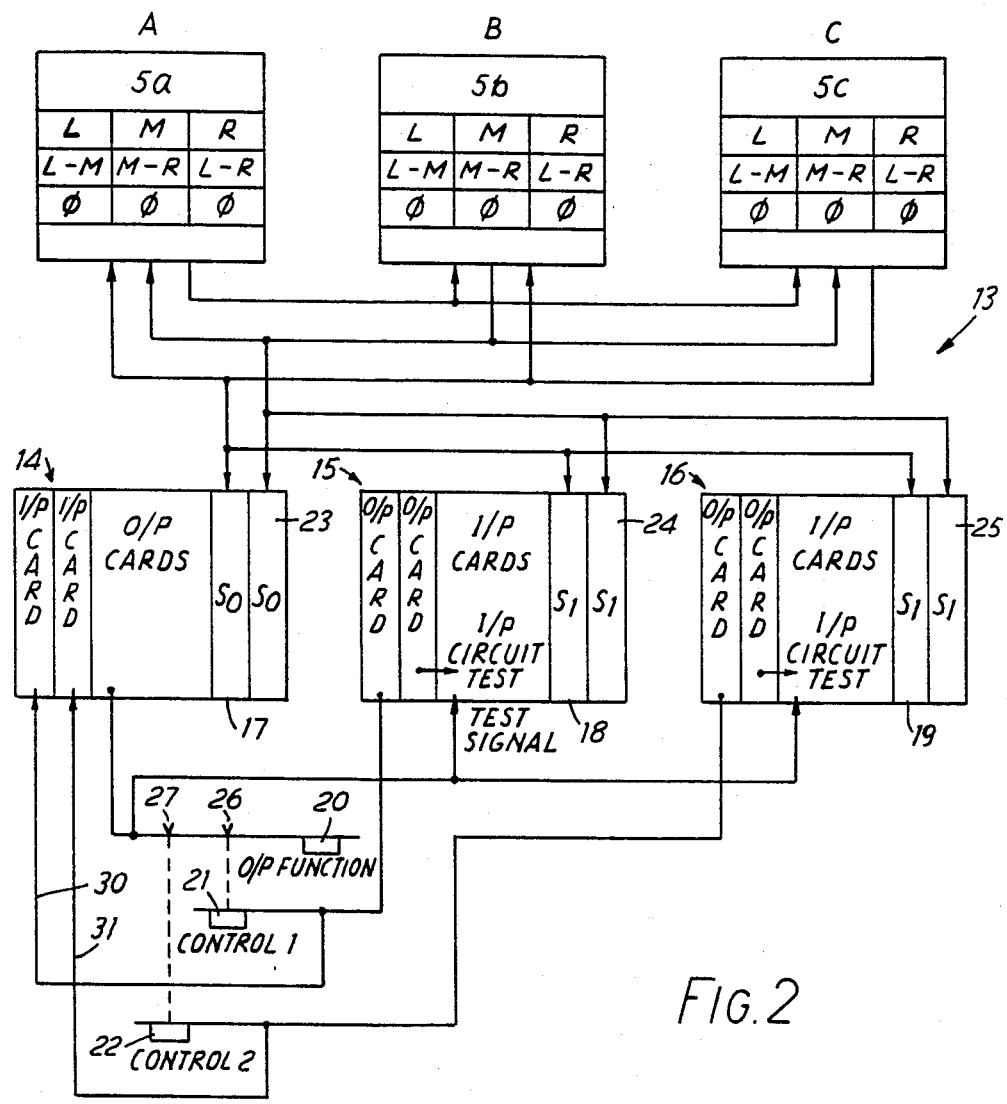
FIG. 2 shows in greater detail the arrangement for consolidating the sub-system outputs and providing the required system integrity.

Referring now to FIG. 2, this shows in greater detail the circuit means for consolidating the sub-system outputs and providing the required system output integrity. The sub-systems labelled A, B and C, include interlocking computers 5a, 5b and 5c, which carry out interlocking functions involving a multiplicity of signals relating to a large number of traffic control devices in order to ensure that no conflict exists in the multiplicity of control signal outputs generated by each interlocking sub-system. Each sub-system produces a serial output consisting of a device address code word and a device-setting code word. In the system illustrated, the output from sub-system C is preferred and is thus connected from the sub-system to an output multiplexer housing 14.

The housing 14, and housings 15 and 16 are similar, is constructed as a modular arrangement in which a multiplicity of printed circuit cards are housed as a unit and interconnected by communal power supply and data input, output and exchange busses organized according to a standard configuration. Thus, into each housing, any mix of different types of cards can be inserted according to requirements. Housing 14 includes a first input scanner card 17 which receives the preferential serial output from sub-system C and multiplexes the signals to a range of output driver cards including output signal amplifying means which are connected to individual traffic control devices. One such output line is shown connected to energise device 20 but it is to be understood that this is merely one of many.

The output from sub-system B is connected to a second input scanner card 23 which provides an alternative output signal source in the event of sub-system being judged faulty and being "taken off-line" or disqualified. Card 23 is essentially identical to card 17 and can take over completely all its functions.

The outputs of all three sub-systems A, B and C are mutually exchanged for the purposes of error detection checking. The sub-systems are mutually interconnected in a ring configuration so that each processor has a similar neighbour to the left and another to the right. Each sub-system computer or processor receives all sub-system outputs and stores the outputs in memory means, for each corresponding output a difference result is then computed and temporarily stored in a memory table. For example, if no difference exists, that is represented by a 0 data bit and a positive difference result is represented by a 1 data bit. By labelling the sub-systems M for me, L for left and R for right, each sub-system is able to be constructed and arranged identically. In each case, the computed differences between itself and each of the other two sub-systems are labelled M minus L (me minus left) L misus R (left minus right) and, R minus M (right minus me).

All the possible difference results are stored in a reference table in a second memory means and once in every interlocking program cycle a means for comparing the results steps through corresponding pairs of locations comparing each actual result with the difference result table. When a difference is found, the corresponding subtraction equation is read out from the reference table. Since a genuine error will cause two wrong results, two subtraction equations will be read out and further comparison of these to determine the common factor pinpoints the sub-system in error. A typical scanning period lies in the range of 0.25 seconds to 1.00 seconds so that no error should remain undetected for more than such a period.

A sub-system having judged which sub-system has generated an erroneous control produces an output indicating such on a corresponding error signal line. Thus, sub-system A has three error output lines; sub-system B has three similar error lines; and sub-system C has three similar error lines. These error outputs can be correlated in respect of each sub-system to merely indicate, i.e. to flag, the production of an error or, preferably, to activate means for disabling, or inhibiting, or generally disqualifying, the faulty sub-system such as by switching off its power supply. Logic gating for such correlation is known in the art and is not shown in FIG. 2. A gating arrangement in which at least two of the sub-systems must agree that the third is in error is sufficient.

FIG. 3 shows at (a) the imputed difference tables for each micro-processor, assuming a fault exists in sub-system A. FIG. 3a is divided into three sections corresponding to sub-systems A, B and C, respectively, from left to right in the left of each section the sub-system outputs are represented by an '0' or a '1' and to the right of each section, the computer difference table is shown and it will be seen in each case that where a difference is computed, as represented by a figure '1', but the only common output in each of those differences is the output of sub-system A, the conclusion therefore is that sub-system A has suffered a fault. The preferred way of dealing with this situation is to suspend the contribution of the output of the faulty sub-system either by shutting-down the whole sub-system or by applying an inhibit signal to the output circuits represented by line 12a, 12b and 12c in FIG. 1.

FIG. 3b shows the result in the computer difference table if sub-system B produces a fault and is completely shut-down, by agreement of A and C, and then a nonsimultaneous change occurs in the outputs of the two remaining sub-systems which are continuing to run asynchronously. It will be observed that the integrity of the system output is maintained since, although the processors agree that a change existed for one scan cycle, the change was not detected in two consecutive scan cycles. FIG. 3(c) shows the results of the situation in which sub-system B has failed and has been shut-down, the output of sub-system C now remains as a '0' bit while that of system A changes to a '1' bit and although a difference is detected for more than two consecutive scan cycles, the micro-processors cannot determine which of the sub-systems is at fault, and consequently they shut-down the total system. The output of each sub-system is therefore shut-off after it has either output a change that was not required, or output no change when one should have been made.

In order to allow for asynchronous running of the sub-systems A, B and C, the cards 17 and 23 in housing 14 include means for storing control signals from the selected sub-system for at least one output cycle and a comparator for reading out a stored control signal only when the corresponding signal in the succeeding cycle agrees, there is therefore a delay of one cycle period during which time the remaining sub-systems B and C will also have completed the same functional cycle and will have checked the output of sub-system A for correctness. The interlocking computers therefore arrange to repeat output commands in the next processing cycle, so that if a command is seen to be repeated, it will be safe to put it into effect, and a system which outputs one false instruction will be shut-off before it can repeat it.

An output arrangement generally indicated at 13 in FIG. 2, is arranged only to respond to repeated commands. The left hand scanning processors (17, 18, 19) in each output scanner housing (14, 15, 16) are all fed with the serial output from the same interlocking computer. Output scanning processor 17 receives the repeated commands and, if so instructed, causes energisation of an output device 20 by driving through a signal amplifying device on the appropriate output card. Device 20 is one of a plurality. Input scanning processors 18 and 19 immediately sense the energisation of 20 through test feedback inputs to their respective housings 15 and 16 and check that this event coincides with the command they received. To ensure that the output from housing 14 remains controllable by 17, and does not continue to energise 20 because of a failure, scanning processor 17 causes the output drive to 20 to contain short test pulses to which 20 does not respond. The inputs to 15 and 16 observe these test pulses and can therefore ensure that the output of 14 is under proper control of 17. An output of each housing 15 and 16 is therefore energised as acknowledgement of agreement with the function of 17, and these outputs energise control relays 21, 22, respectively, which allow power to a group of output devices—including 20. The drive signals to 21 and 22 also contain test pulses which are monitored by inputs 30, 31, to housing 14. Should these inputs fail to contain test pulses then scanning processor 17 de-energises all the group of outputs whose power is controlled by 20 and 21. If it is permissible to totally shut the system from one fault, then 16, 19 and 22 are not required. If, however, it is required to continue to operate groups of outputs except those controlled by 21 and 22, then 16 and 19 are required to protect the system against further faults. Also, if a failure occurs in scanner processors 17, 18 or 19, or their associated highways, the whole system may continue by using 23, 24, 25, and another interlocking computer's serial output. There remains, however, the problem that, while 20 is de-energised, the inputs to 15 and 16 may go open circuit, when a subsequent failure of 14 to a state which energises 20 would remain unnoticed. Thus other outputs of housings 15 and 16 are used to selectively false-feed energy to the inputs which can then be tested by 18 and 19 (or 24 or 25) to ensure that the inputs and the associated connections to 20, could represent an energised state should one occur on the output from 14. Control devices 21 and 22 are fail-safe devices, in this example signalling relays, designed so that when de-energised, their contacts 26 and 27 are guaranteed tp open.

Computer-based interlocking systems operating in a fail-safe manner, as described above, will, in the event of a total shut-down occuring, prevent this equipment being used to operate the railway and emergency procedures will be required to provide some degree of control through restricted facilities, and these emergency procedures may be less safe than those under control of the normal interlocking program.

Redundancy among the computer sub-systems enables the whole system to continue operation after a single failure has been detected, and a contribution of that sub-system removed from the final output, nevertheless, it is essential that failures are rectified as quickly as possible so that maximum sub-system availability is restored as soon as possible to guard against the effects of a further failure occurring in one of the remaining sub-systems. However, extensive monitoring and diagnostic routines will increase the cycle time, and thus directly reduce the rate at which faults are noticed, consequently reducing the level of safety. Thus, only the most basic of tests are performed in the vital software (computers in 4, 5, 9 and 13) and all diagnostic work is effected in the organisation processor (7). Although triple redundancy of the computer sub-systems provides for continued working in the event of hardware failure in one of the sub-systems, certain failures in fail-safe detecting circuits in a wayside equipment, which provide the vital input data, could lead to ambiguous situations arising in which different sub-systems implement different interlocking strategies which are individually entirely safe, but collectively are incompatible. This problem does not arise where the three sub-systems are synchronised because they perform identical operations simultaneously, but spurious events, e.g., lightning strikes, can cause simultaneous malfunctions in all the sub-systems of a synchronously operated system and these are not guarded against by sub-system diversity.

In a diverse asynchronous system, of the type described, situations which could cause ambiguous states are studied and when a potential for such a state is detected, each sub-system informs the central interlocking control processor which then only allows output changes which tend towards safety while further restricting operation. The software program of the interlocking computer causes the situation to be reported to the organisation computer which, in the event, is programmed to act as an arbiter. If the organisation computer finds that the sub-systems subsequently agree on strategy, then execution of the interlocking function is allowed to proceed normally and the sub-systems each move their outputs to the state required to implement the strategy required. However, if the organisation computer receives different strategies from the sub-systems, it institutes the execution of at least part of the interlocking program to allow for the possibility that after a time delay, the ambiguity in the inputs may have been resolved. Although the organisation computer has no safety functions to perform itself, it is able to delay the production of a sub-system output to a proceed or less restrictive state.

Having thus described our invention what we claim is:

1. A control signal interlocking system comprising three parallel sub-systems, each of which is connected to receive the same input data and is arranged to perform a signal interlocking function in a continuously repeated cyclic operation, a sub-system output gating circuit, controlled by a sub-system output selecting logic circuit, for preferentially selecting and connecting a first sub-system output to provide the system output and for alternatively selecting a second sub-system output if the first sub-system is found to be in error, said sub-system output selecting logic circuit comprising a comparator in each sub-system for receiving outputs from all the sub-systems, said comparators including difference determining means for determining difference results between pairs of the sub-system outputs, memory means for storing a reference table of possible difference results, and comparison means connected to said difference determining means and said memory means for comparing the actual difference results determined by said difference determining means with the reference difference results stored by the memory means to determine, if differences exist, if the first sub-system is in error.

2. An interlocking system as claimed in claim 1 wherein the output from each sub-system is connected to the comparators of the other sub-systems in a ring configuration so that the sub-systems are identical.

3. An interlocking system as claimed in claim 2 wherein the sub-systems operate asynchronously and the output selecting logic circuit and output gating circuit are arranged to connect a sub-system output to the control system output only after said output has been repeated in two successive cycles of operation.

4. An interlocking system as claimed in claim 2 wherein the comparator in each sub-system is arranged to provide an error-indicating signal with respect of each sub-system.

5. An interlocking system as claimed in claim 4 including a logical majority voting circuit for correlating the error-indicating signals for each sub-system to provide a safety signal indicating the integrity of each sub-system.

6. An interlocking system as claimed in claim 3 wherein the system includes a test monitor arrangement including a test pulse generator and wherein the control system output is connected through a control output signal-amplifier to energize an output function device, a connection being provided between the signal-amplifier and the output function device which includes at least one switch energized to close by an output signal from said test monitor arrangement which is generated responsive to the receipt of test pulse signals injected into the control system output by said test pulse generator before the signal-amplifier, said test pulse signals being capable of operating the monitor arrangement after the signal-amplifier in order to check the operability of the signal-amplifier.

* * * * *